Figure 2:
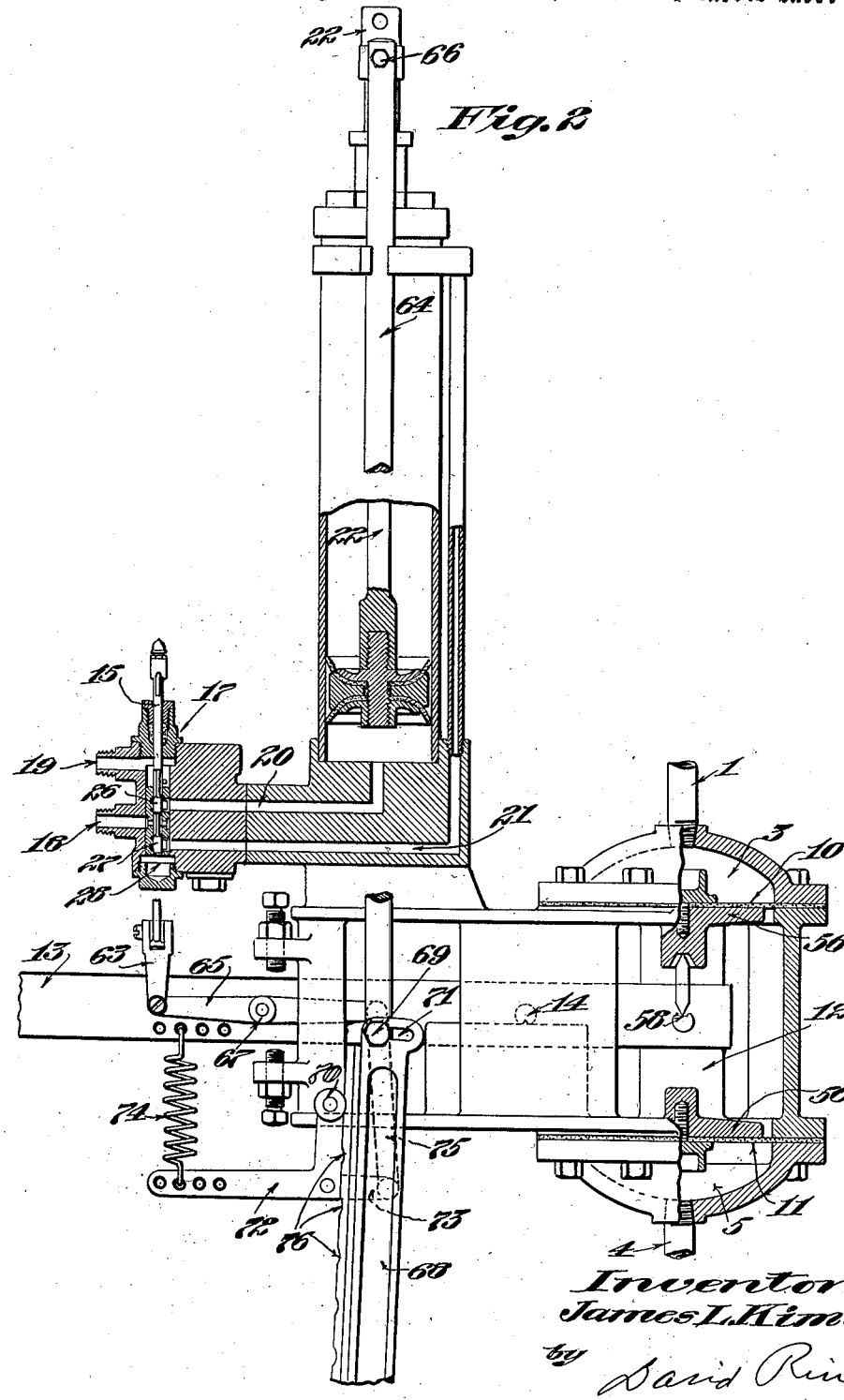

Dec. 8, 1925.

J. L. KIMBALL 1,564,686

REGULATOR

Original Filed March 28, 1921    2 Sheets-Sheet 1

Fig.1

Inventor
James L. Kimball
by David Rines
his Atty.

Dec. 8, 1925.  
J. L. KIMBALL  
REGULATOR  
Original Filed March 28, 1921 2 Sheets-Sheet 2  
1,564,686

Inventor  
James L. Kimball  
by David Rines  
his Atty.

Patented Dec. 8, 1925.

1,564,686

UNITED STATES PATENT OFFICE.

JAMES LEWIS KIMBALL, OF SALEM, MASSACHUSETTS, ASSIGNOR TO RUGGLES-KLINGE-MANN MFG. CO., OF SALEM, MASSACHUSETTS, A CORPORATION OF MASSACHUSETTS.

REGULATOR.

Continuation of application Serial No. 456,148, filed March 28, 1921. This application filed November 14, 1924. Serial No. 749,912.

*To all whom it may concern:*

Be it known that I, JAMES LEWIS KIMBALL, a citizen of the United States, and a resident of Salem, in the county of Essex and Commonwealth of Massachusetts, have invented a new and useful Improvement in Regulators, of which the following is a specification.

The present invention relates to control systems and more particularly to regulators for controlling the pressure of pressure systems. The present application is a continuation of application Serial No. 456,148, filed March 28, 1921.

Pressure systems are commonly automatically regulated through the agency of diaphragms that are responsive to variations in the pressure of the system, such, for example, as the pressure of the steam generated by a boiler. The diaphragm acts upon a scale beam that controls some mechanism for regulating the pressure of the system. In some pressure systems, the scale beam is acted upon by a second diaphragm that is responsive to the pressure of the water that is pumped into the boiler, or, as it is termed, the feed-line pressure. The two diaphragms exert forces upon the scale beam in opposite directions, and the scale beam is operated in one direction or the other according to whether the force exerted by the one diaphragm or the other is predominant. In such systems, it is usually desirable to maintain the feed-line pressure in excess of the steam pressure of the boiler by a predetermined, uniform amount. Any variation or fluctuation from this predetermined amount will cause the scale beam to operate in such direction as will tend to restore the desired conditions. Regulators for controlling a pressure system of this type may be termed excess-pressure-boiler-feed regulators.

An object of the invention is to provide an improved regulator of the above-named character. A further object is to provide a regulator in which the scale beam shall control a powerful, pressure-regulating motor, the operation of which shall be attended with a minimum of friction and shall be controlled independently of the steam generated by the boiler. The motor may be of the fluid-operated, electric, or any other desired type. The operation of the motor is effected without the use of a stuffing box, thus further reducing the friction.

Excess-pressure-boiler-feed regulators have hitherto been restricted, in practice, to the control of steam- or turbine-driven pumps, and the variations in the pressure of the system were communicated to a throttling valve located in the steam-supply pipe. It is therefore a further object of the invention to provide an improved regulator of the above-described character that shall be of more general application. To this end, the regulator of the present invention may be used not only to operate throttling valves, but also to control electric-motor rheostats, shift motor-controlling belts, operate power-driven pump clutches, and the like.

Other and further objects will be explained in connection with the accompanying drawings, in which Fig. 1 is a diagrammatic view illustrating the present invention in a preferred form; and Fig. 2 is an enlarged view is compared to Fig. 1, partly in section, of a portion of the apparatus shown in Fig. 1.

The invention may be used in connection with any desired number of boilers 50, two being diagrammatically shown for illustrative purposes. The boilers may be of the ordinary steam-generating variety or of any other desired kind, such as the mercury type, and the term "steam" will be employed in the specification and the drawings in this generic sense. A water pipe 1 is supplied with water by a centrifugal pump 52 that is driven by an electric motor 54. The water pipe 1 extends across the front of the boilers, as is diagrammatically shown in Fig. 1, and is connected with valves 2 for controlling the supply of water to the respective boilers. The water pipe 1 is connected with a pressure chamber 3 of the regulator. A pipe 4 connects the steam chambers of the boilers with a pressure chamber 5 of the regulator. The pressure chambers 3 and 5 are independent of each other and are oppositely disposed, as is illustrated more particularly in Fig. 2. The pressure chambers are closed by flexible, rubber diaphragms 10 and 11, respectively. A double diaphragm is thus provided, one side of which is exposed to the pressure of the water supplied by the pump and the other side of which is exposed to the pressure of the steam generated by the boiler. A member 12 is interposed between the diaphragms. The member 12 is provided with flanges 56 at its ends and the flanges are disposed in contact with the atmospheric sides of the diaphragms. A scale beam 13 is connected with the member 12 at 58 and is fulcrumed at 14. The scale beam is thus controlled in accordance with variations of the pressure of the steam generated by the boilers and the pressure of the water supplied by the pump. By avoiding the use of a stuffing box, the friction is lessened and the sensitivity thereby increased. A weight 24 is mounted upon the scale beam 13 so as to apply a force upon the diaphragm 10 in excess of the force exerted upon the diaphragm 11. The feed-line pressure is in this manner maintained above the boiler pressure by a value determined by the weight 24 and its position upon the scale beam 13.

The speed of the motor 54 is controlled by a rheostat 8. The rheostat is controlled by a counter-weight 9 and a reversible motor 23. The motor may be of any desired type, such as electric, but is illustrated as hydraulically operated. A chain or flexible cord 6 is coiled around a drum 60 of an arm 62 of the rheostat and extends over sheaves or pulleys 7. One end of the chain is secured to the counterweight 9. The other end is secured to the plunger or piston rod 22 of the motor. Operation of the rheostat arm 62 is thus controlled in one direction by the downward movement of the motor plunger or piston, and in the other direction by the counterweight 9. To each position of the motor plunger corresponds a definite position of the rheostat arm and, therefore, a definite control of the electric motor.

When the feed-line pressure in the chamber 3 exceeds the steam pressure in the chamber 5 by an amount determined by the counterweight 24 and its position upon the scale beam, the latter will occupy its normal, balanced position. Variation in the pressure of either chamber will result in corresponding movement of the member 12 and this will be converted into movement of the scale beam. The movement of the scale beam, in turn, is communicated to a controlling element 17 for the motor 23. If the motor 23 is electric, the controlling element may be a pilot switch. If the motor is hydraulic, as illustrated, the controlling element may be a pilot valve, the stem of which is indicated at 15. The pilot-valve stem 15 is provided with cylindrical portions 26 and 27 that control the admission of fluid under pressure to, and its exhaust from, the cylinder of the motor 23. The pilot-valve stem may be directly connected with the scale beam by a yoke 16, as is illustrated in the before-mentioned application. It is preferred, however, for reasons more fully explained in a copending application, Serial No. 574,975, filed July 14, 1922, to connect the yoke 16 indirectly to the scale beam through a link 63 and a floating lever 65, the latter of which is intermediately pivoted to the scale beam at 67. The construction is such, as is explained in the said application, Serial No. 574,975, that the floating lever 65 and the scale beam move up and down practically as a unit in response to pressure changes, effecting a corresponding movement in the pilot-valve stem 15. Reference may be made to the said application for a fuller description, a knowledge of which is not, however, necessary to an understanding of the present invention.

Referring more particularly to Fig. 2, the preferred pilot valve 17 is shown provided with an inlet opening 18 and an outlet or exhaust opening 19. The inlet opening may be connected to any suitable source of fluid under pressure, such as the water mains or compressed air. The under side of the piston 22 is connected with the valve 17 by a passage 20 and the upper side by a passage 21. A passage 28, cored in the side of the valve casing, connects the lower portion of the valve with the exhaust opening 19. The valve stem is illustrated in the neutral position, in which admission of fluid to, and its exhaust from, the motor cylinder is prevented, to maintain the piston against movement. When the valve stem 15 is raised by the scale beam 13, water under pressure (assuming connection to the hydraulic mains) is admitted through the inlet opening 18 and the passage 20 to the under side of the piston 22. The upper portion of the motor cylinder is at the same time vented to the atmosphere by way of the passages 21 and 28 and the waste connection 19. The piston 22 is thus caused to move upward, permitting the counterweight 9 to actuate the rheostat arm 62. When the scale beam is lowered, on the other hand, the valve stem 15 is also lowered. The lower portion of the motor cylinder is then connected by the passage 20 with the atmosphere and the upper portion of the cylinder is connected with the inlet opening 18 by the passage 21. The motor piston 22 is thus moved downward, causing the actuation of the rheostat arm 62 in the opposite direction.

Regulators of the above-described character have a tendency to hunt, permitting the actuation of the motor and, therefore, of the rheostat or other controlled device, to a position somewhat beyond that required by the value of the pressure that caused the motor actuation. The pressure is thus caused to build up to a value too far to one side of the normal. The regulator thereupon proceeds to operate in the opposite direction, but does not become checked until the pressure attains a value too far to the other side of the normal. To reduce this hunting action, the regulator is provided with a compensating attachment. A rod 64 is secured to the piston rod 22 in any desired manner, as by means of a screw 66. A cam or wedge 68 is adjustably secured to the lower end of the rod 64 at a small angle to the vertical. This angle may be varied, as desired, by means of pin-and-slot arrangements 69, 71. The wedge is engaged by a roll 70 at one end of a pivoted bell-crank lever 72, the other end of which is connected, by a spring 74, with the scale beam. The bell-crank lever 72 is provided with a projecting arm 73 that is connected by a link 75 to the floating lever 65.

Assuming that the scale beam rises in response to a pressure variation, the valve stem 15 will be raised to cause the motor piston to move upward. As the motor piston moves, it carries the wedge 68 with it, causing the bell-crank lever 72 to react upon both the scale beam and the pilot-valve stem. Upon the scale beam the bell-crank lever will exert an increasing force, through the spring 74, in opposition to the force which caused the scale beam to rise. This effects a change in the pressure setting of the diaphragm. The pilot-valve stem will at the same time tend to be returned to its neutral position by the connections 16, 63, 65, 67, 75, 73 and 72. There is thus a tendency for the pilot-valve stem to be returned to its neutral position without affecting the equilibrium of the scale beam, and independently of the scale beam. As soon as the valve stem is returned to its neutral position, the movement of the motor piston is stopped. The motor piston has, in the meantime, had its effect upon the position of the rheostat arm 62, causing a corresponding change in the operation of the motor 58. This motor acts upon the pump 52 to cause a change in the feed-line pressure. A similar effect, in the opposite direction, takes place when variations in pressure cause a lowering of the scale beam.

Though a more sensitive response is produced by using the floating lever, the operation would be the same if the pilot-valve stem were directly connected to the scale beam. A further increase in sensitivity is produced by the use of notches 76 in the wedge 68, though these, too, are not essential to the operation, as a "floating" or other incremental control is also effective. The notches 76 cause abrupt action of the bell-crank lever and, therefore, an abrupt return of the pilot-valve stem to its neutral position and this, in turn, serves to accentuate the travel of the motor piston and, therefore, of the rheostat arm 68. The entire compensating effect tends thus to be obtained at definite cut-off points, corresponding to the position of the notches 76. The motor piston thus tends to operate between definite points and to stop at those points. Hunting to one side or the other of the points is eliminated. This step-by-step control is of further advantage if the steps are made to correspond to the contact points of the rheostat. If the motor 23 controls a steam-driven pump, the "floating" control is equally good.

In operation, a switch (not shown) is first operated to close the circuit (not shown) of the motor 54. The motor thereupon operates to drive the pump 52. The pump, in turn, supplies the boilers with water under a pressure that is communicated to the pressure chamber 3. As soon as the pressure in this chamber exceeds the boiler or steam pressure by a predetermined amount, the value of which depends upon the weight 24 and its position upon the scale beam, the pressure in the chamber 3 will overcome the boiler pressure in the chamber 5, causing the scale beam to be raised. The valve stem 15 will thereupon be raised causing, in its turn, the raising of the motor piston 22 and the actuation of the rheostat arm 62 to cause the insertion of resistance in the motor circuit. The pump is thereupon slowed down, thus relieving the pressure in the pressure chamber 3. The operation of the motor piston 22 will be checked by the wedge 68, as above described, to minimize hunting. If the boiler pressure in the chamber 5 should be reduced, a similar result will follow. If the boiler pressure should be increased, or the feed-line pressure reduced, on the other hand, the plunger 22 would be moved downward, causing the removal of resistance from the motor circuit, and consequent speeding up of the pump. A substantially uniform pressure in excess of the boiler pressure is thus maintained in the chamber 3.

Modifications may be made by persons skilled in the art without departing from the spirit of the invention, and such modifications are intended to be included within the scope of the invention, as defined in the appended claims.

What is claimed is:

1. In a steam-generating system comprising a boiler, a pump for supplying the boiler with water, and a motor for driving the pump, means independent of the steam generated by the boiler for driving the pump motor, a motor for controlling the pump motor, and means for controlling the controlling motor, said means being controlled in accordance with variations in the pressure of the steam generated by the boiler and the pressure of the water supplied by the pump.

2. In a steam-generating system comprising a boiler, a pump for supplying the boiler with water, and a motor for driving the pump, a fluid-operated motor for controlling the pump motor, a source of fluid pressure independent of the steam generated by the boiler and of the water supplied by the pump for operating the fluid-operated motor, and means for controlling the fluid-operated motor, said means being controlled in accordance with the variations in the pressure of the steam generated by the boiler and the pressure of the water supplied by the pump.

3. In a steam-generating system comprising a boiler, a pump for supplying the boiler with water, a motor for driving the pump and a double diaphragm one side of which is exposed to the pressure of the water supplied by the pump and the other side of which is exposed to the pressure of the steam generated by the boiler, means independent of the steam generated by the boiler for driving the pump motor, a motor for controlling the pump motor, and means controlled by the double diaphragm for controlling the controlling motor.

4. In a fluid-pressure system having two pressure chambers, a pump for controlling the pressure in one of the chambers, a fluid-operated motor for controlling the pump, a source of fluid pressure independent of the fluid pressure in the chambers for operating the fluid-operated motor, a pilot valve for controlling the supply of fluid pressure from the source to the motor, and means for controlling the pilot valve in accordance with variations in pressure in the pressure chambers.

5. In a steam-generating system comprising a boiler, a pump for supplying the boiler with water, a motor for driving the pump, and a double diaphragm one side of which is exposed to the pressure of the water supplied by the pump and the other side of which is exposed to the pressure of the steam generated by the boiler, a fluid-operated motor for controlling the pump motor, a source of fluid pressure independent of the steam generated by the boiler and of the water supplied by the pump for operating the fluid-operated motor, a pilot valve for controlling the supply of fluid pressure from the source to the fluid-operated motor, and means controlled by the double diaphragm for controlling the pilot valve.

6. In a fluid-pressure system comprising a fluid generator, means for supplying the fluid generator, and means independent of the fluid generated by the generator for driving the supplying means, means for controlling the driving means, and means controlled in accordance with the variations in pressure of the fluid supplied by the generator and of the supply of the supplying means for controlling the controlling means.

7. In a steam-generating system comprising a boiler, a pump for supplying the boiler with water, and a motor for driving the pump, means independent of the steam generated by the boiler for driving the motor, means for controlling the motor, a motor for controlling the controlling means, and means for controlling the controlling motor, said second-named means being controlled in accordance with variations in the pressure of the steam generated by the boiler and the pressure of the water supplied by the pump.

8. In a steam-generating system comprising a boiler and a pump for supplying the boiler with water, an electric motor for driving the pump having a speed-controlling rheostat, and means for controlling the rheostat in accordance with the variations in the pressure of the steam generated by the boiler and the pressure of the water supplied by the pump.

9. In a steam-generating system comprising a boiler, a pump for supplying the boiler with water, and a motor for driving the pump, a fluid-operated motor for controlling the pump motor, a pilot valve having two effective positions in one of which it controls the operation of the fluid-operated motor in one direction and in the other of which it controls the operation of the fluid-operated motor in the opposite direction, the pilot valve having also a neutral position in which the fluid-operated motor is maintained against operation, and means for controlling the pilot valve in accordance with the pressure of the steam generated by the boiler and the pressure of the water supplied by the pump to effect an incremental actuation of the fluid-operated motor, 10. In a steam-generating system comprising a boiler and a pump for supplying the boiler with water, an electric motor for driving the pump having a manually operable switch for closing the circuit of the motor and a speed-controlling rheostat, a fluid-operated motor, operable in opposite directions, means whereby the operation of the fluid-operated motor in one direction effects the operation of the rheostat in one direction, a counter-weight for operating the rheostat in the opposite direction when the fluid-operated motor is operated in the opposite direction, a pilot valve having two effective positions in one of which it controls the operation of the fluid-operated motor in one direction and in the other of which it controls the operation of the fluid-operated motor in the opposite direction, the pilot valve having also a neutral position in which the fluid operated motor is maintained against operation, and means for controlling the pilot valve in accordance with the pressure of the steam generated by the boiler and the pressure of the water supplied by the pump to effect an incremental actuation of the fluid-operated motor.

11. In a steam-generating system comprising a boiler, a pump for supplying the boiler with water, and a motor for driving the pump, a motor for varyingly controlling the pump motor, the controlling motor having a plurality of positions each corresponding to a different control of the pump motor, and means for operating the controlling motor to the said positions, the said means being controlled in accordance with variations in the pressure of the steam generated by the boiler and the pressure of the water supplied by the pump.

12. A fluid-pressure system having, in combination, two oppositely disposed pressure chambers each having a diaphragm, the diaphragms being disposed opposite to each other, means for controlling the pressure in one of the chambers, means for controlling the pressure-controlling means, a scale beam exterior to the chambers interposed between and connected to the diaphragms for controlling the second-named means, means for controlling the scale beam in accordance with variations in pressure in the pressure chambers, and a weight upon the scale beam for exerting a force upon the diaphragm of the said one chamber to maintain the pressure in the said one chamber in excess of the pressure in the other chamber.

13. The method of maintaining a substantially uniform excess pressure in the water supplied by a pump to a boiler over the steam generated by the boiler that comprises driving the pump by a motor that is driven from a source of energy independent of the steam generated by the boiler, and regulating the operation of the motor in accordance with variations in the pressure of the steam generated by the boiler and the pressure of the water supplied by the pump.

14. In a steam-generating system comprising a boiler, a pump for supplying the boiler with water, and a motor for driving the pump, a motor for controlling the pump motor, an element for controlling the controlling motor having a neutral position in which the controlling motor is maintained against operation and two effective positions in which it controls the operation of the controlling motor in opposite directions, and means for controlling the element in accordance with the pressure of the steam generated by the boiler and the pressure of the water supplied by the pump.

15. In a steam-generating system comprising a boiler, a pump for supplying the boiler with water and a motor for driving the pump, a motor for controlling the pump motor, means for controlling the controlling motor, the said means being controlled in accordance with the pressure of the steam generated by the boiler and the pressure of the water supplied by the pump, and compensating means controlled by the controlling motor for controlling the controlling motor.

16. In a steam-generating system comprising a boiler, a pump for supplying the boiler with water, and a motor for driving the pump, means for controlling the speed of the pump motor, a motor for actuating the speed-controlling means, a pressure-responsive device controlled in accordance with the pressure of the steam generated by the boiler and the pressure of the water supplied by the pump, means controlled by the pressure-responsive device for rendering the controlling motor effective to actuate the speed-controlling means, and compensating means controlled by the controlling motor for rendering the controlling motor ineffective further to actuate the speed-controlling means.

17. In a steam-generating system comprising a boiler, a pump for supplying the boiler with water, and a motor for driving the pump, a reversible motor for controlling the pump motor, an element for controlling the controlling motor having a neutral position in which the reversible motor is maintained against operation and two effective positions in which it controls the operation of the reversible motor in opposite directions, means for moving the element to the one or the other effective position, the moving means being controlled in accordance with the pressure of the steam generated by the boiler and the pressure of the water supplied by the pump, and compensating means controlled by the controlling motor for returning the element to the neutral position.

18. In apparatus for controlling boiler-feed-line pressure, consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed controlling means, and compensating means operated by the motor for rendering the motor inoperative and to cause a further change in either the steam or pump pressure for a further operation of the motor.

19. In apparatus for controlling boiler feed line pressure consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed-controlling means, and compensating means operated by the motor for effecting a greater or less pressure variation of either the pump or steam pressure between the limits of operation of the motive means.

20. In a pressure controller, in combination, a pressure-responsive device consisting of two opposing pressure chambers, means to counteract a portion of the pressure in one of said chambers, a motor to control the pressure in the counteracted chamber a predetermined amount in excess of the pressure in the other chamber, means controlled by variations in pressure in either of said chambers to operate the motor, and compensating means operated by the motor for rendering the motor ineffective until a further change in pressure in either of said chambers.

21. In a pressure controller, in combination, a pressure-responsive device consisting of two opposing pressure chambers, means to counteract a portion of the pressure in one of said chambers, a motor to control the pressure in the counteracted chamber a predetermined amount in excess of the pressure in the other chamber, means controlled by variations in pressure in either of said chambers to operate the motor, and compensating means operated by the motor for effecting a greater or less pressure variation in either pressure chamber between the limits of operation of the motor.

22. In apparatus for controlling boiler-feed pumps, a motor, means controlled by said motor for controlling the speed of the pump, a diaphragm controlled in accordance with the pump pressure, means controlled by said diaphragm for controlling the motor, means to counteract the pressure on said diaphragm, means responsive to variation in boiler pressure for changing the pressure setting of said diaphragm, and means operated by the motor for changing the pressure setting of said diaphragm, the last named means being for the purpose of effecting a predetermined variation in pressure between the operating limits of the motor to prevent hunting action.

In testimony whereof, I have hereunto subscribed my name this 13th day of November, 1924.

JAMES LEWIS KIMBALL.